United States Patent [19]

Lacroix et al.

[11] Patent Number: 4,476,997
[45] Date of Patent: Oct. 16, 1984

[54] AUTOMATIC DEVICE TO DISTRIBUTE, ORIENT AND POSITION AXES ON MACHINES

[75] Inventors: Marc Lacroix, Viroflay; Raymond Bienvenu, Thiais, both of France

[73] Assignee: Regie Nationale des Usines Renault, Boulogne-Billancourt, France

[21] Appl. No.: 386,519

[22] Filed: Jun. 9, 1982

[30] Foreign Application Priority Data

Jun. 10, 1981 [FR] France .................... 81 11434

[51] Int. Cl.³ .............................................. B65G 47/24
[52] U.S. Cl. ....................................... 221/171; 221/156; 221/193; 221/196; 221/269; 221/293; 198/394; 414/780
[58] Field of Search ................ 221/156, 171, 172–173, 221/193, 195–196, 292, 293, 290, 264, 268, 269; 414/780–781; 198/394, 396

[56] References Cited

U.S. PATENT DOCUMENTS

| 439,030 | 10/1890 | Dieterich | 221/264 X |
| 2,707,547 | 5/1955 | Gewecke | 198/394 |
| 4,081,072 | 3/1978 | Le Vasseur | 221/173 X |

FOREIGN PATENT DOCUMENTS

| 500732 | 6/1919 | France . | |
| 545448 | 4/1977 | U.S.S.R. | 221/171 |

*Primary Examiner*—Charles A. Marmor
*Attorney, Agent, or Firm*—Oblon, Fisher, Spivak, McClelland & Maier

[57] ABSTRACT

A device is disclosed for separating, orienting and positioning axes including at least one operational flat. The device includes a static chute equipped with a wide bottom opening closed by a drawer which is moved with a back and forth motion from a withdrawn position in which it unveils a narrow opening which is large enough to enable the fall of a single axis onto rolling blades which are extended by descending ramps bringing each axis onto two bearing-sliding blades. The bearing sliding blades cooperate with two push plates, as well as a trap borne by the drawer, to produce the roll of the axis in the desired direction, followed by the slide of that axis without rotation to a selected position.

6 Claims, 3 Drawing Figures

AUTOMATIC DEVICE TO DISTRIBUTE, ORIENT AND POSITION AXES ON MACHINES

BACKGROUND OF THE INVENTION

1. Field of the Invention

The present invention concerns the separation, orientation and positioning of parts that are fairly cylindrical hereinafter called axes, each of which includes at least one flat for the positioning of another part. More particularly the present invention concerns the automatic feed of a machine for welding direct drive dog clutches on gear box fork axes.

2. Description of the Prior Art

Axes that have been previously tooled include at least one flat and most often various other indexation toolings such as grooves and notches for the indexed positioning of other parts on the axis. It is necessary to position and orient the axes with accuracy on a welding machine which affixes the fork axis drive dog clutch to the axis. The clutch includes one plane section which is applied to said flat and which is welded, usually with an electron beam.

Usually a large quantity of, the axes are deposited inside a rectilinear action vibrator which includes an exit door that is partially obstructed by a directing blade. Under the effect of the vibration, the axis closest to the door turns on itself until the tooling is appropriate, for instance when the neutral notch or other tooling specially planned for the orientation is in parallel to the orientation blade. The axis itself can then escape by the door and go down along a ramp where it is kept oriented by a continuation of the orienting blade, while the process resumes with the new axis which is displayed in front of the door.

Such a device displays many disadvantages that are caused by the vibrating of the all the axes that are waiting, which represents a large mass. Such devices have little endurance, are usually limited to 20 parts, and they are extremely noisy. Furthermore, they are subject to recurring jamming, and because the indexing is carried out on a tooling process other than the squeeze flat for the direct drive dog clutch, it cannot be used with all transmission axes. Finally, the process used is relatively slow and ill-suited to the high pace permitted by the electron beam welding machines.

SUMMARY OF THE INVENTION

The purpose of the invention is to eliminate the previous disadvantages by achieving a non-vibrating device, which is fast and efficient, which directly achieves the orientation for the squeeze flat of the direct drive dog clutch, and for axes placed at random inside a storage area.

The invention uses a width-wise adjustable chute inside which are placed the axes at random but is parallel. The chute includes at its low point a wide opening that is closed by a fairly horizontal drawer which can be activated for a back-and-forth movement. The chute tip leaves enough room for an axis to pass from the tip of the chute. The chute including guides that allow passage for only one layer of axes beyond its end. In the forward movement of the drawer, the selected axis rests and rolls on bearing tracks which support it fjust below the exit. The axis then moves by way of a downward slope to rest an bearing-sliding blades upon which the axes begin to roll for angular indexing, pushed by the end of the drawer, until the operational flat borne by the axis is rests on one of the bearing-sliding blades that serves as an indexation blade. This makes it possible for the corresponding extremity of the axis to be engaged under the end of the drawer, which has a trap-shaped set-back that continues to push the axis parallel to itself in order to make it slide up to the end of the two blades, a position in which it tilts and falls inside bezels that accurately maintained its position and orientation. Each back and forth movement of the drawer therefore corresponds to the feed of one axis, after which the drawer returns to wait in a drawn back position.

BRIEF DESCRIPTIONS OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
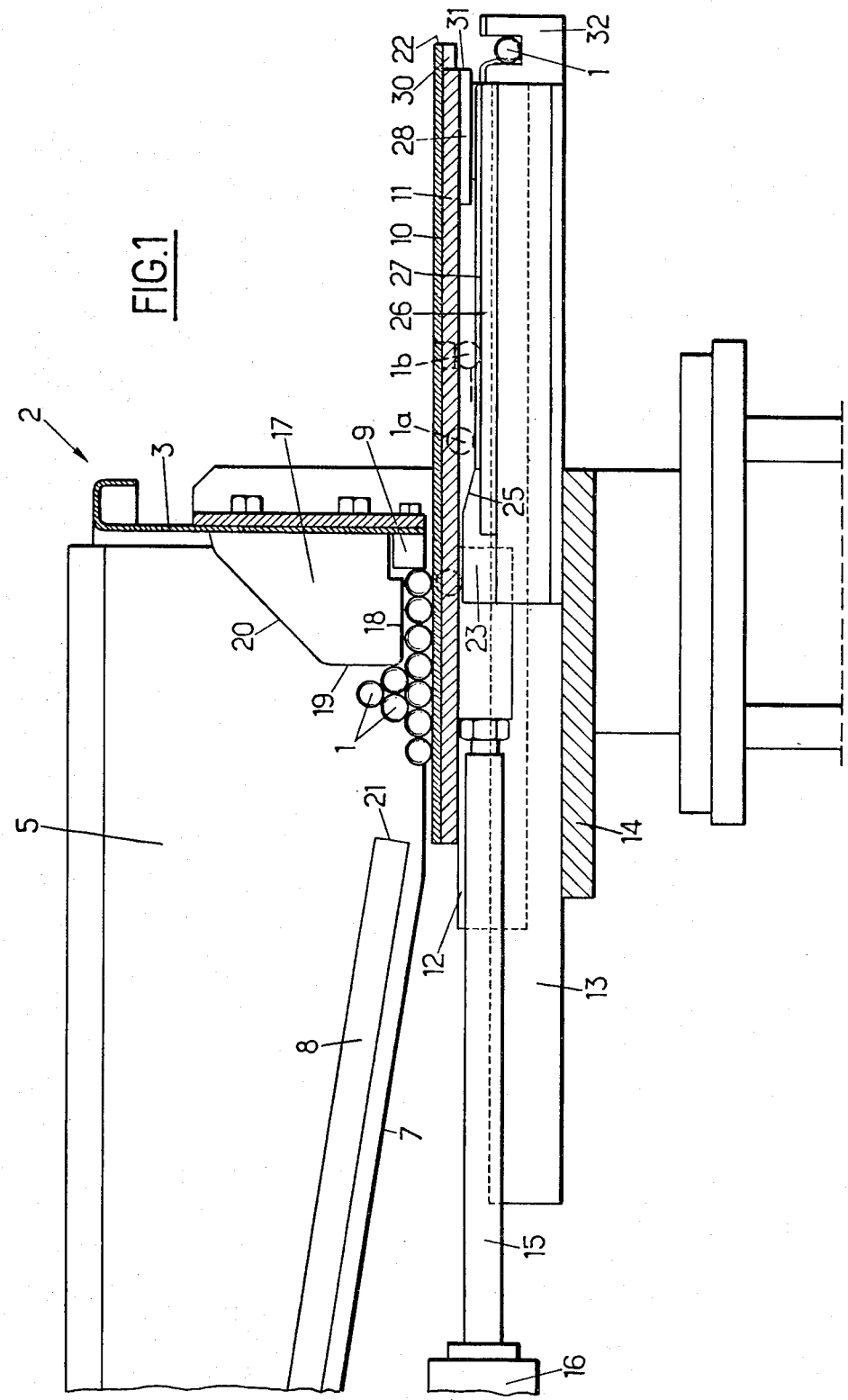
FIG. 1 is a vertical lengthwise cross-section according to I—I of FIG. 2.
Figure 2:
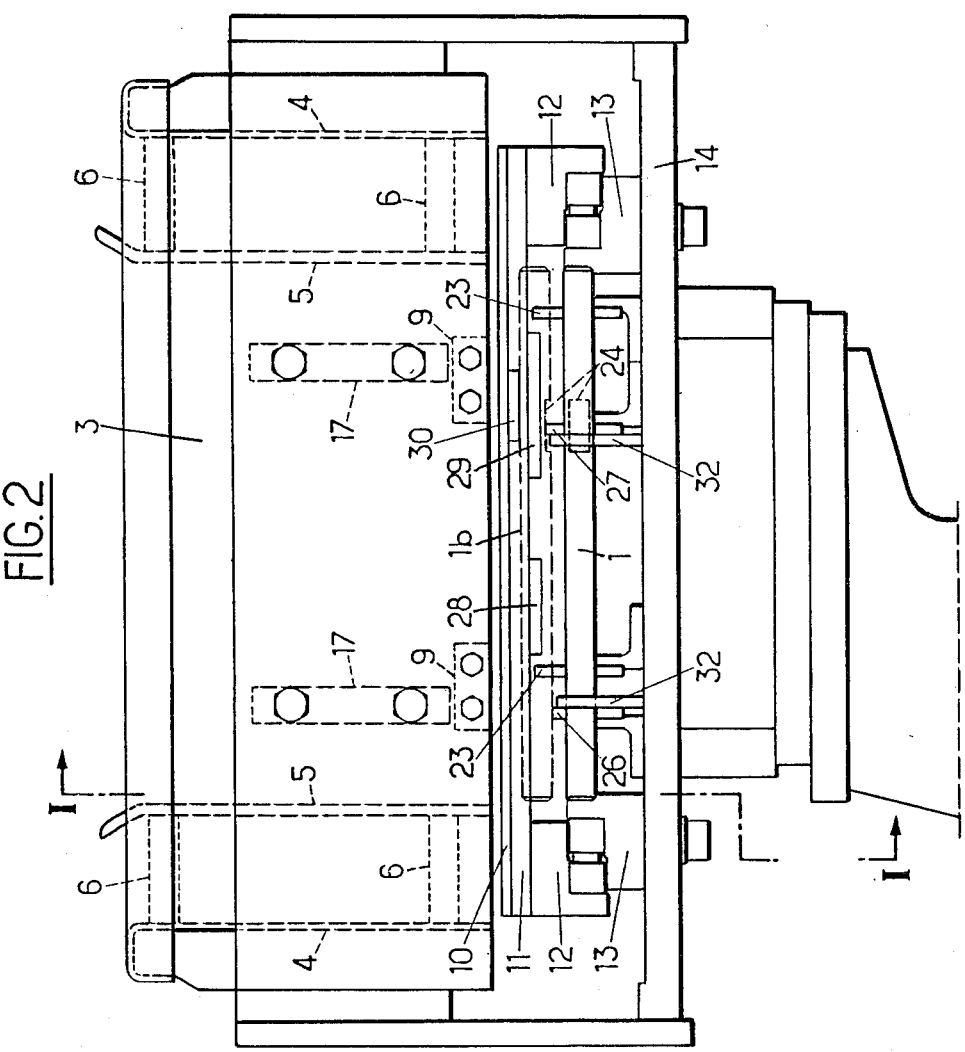
FIG. 2 is an end view of the device.
Figure 3:
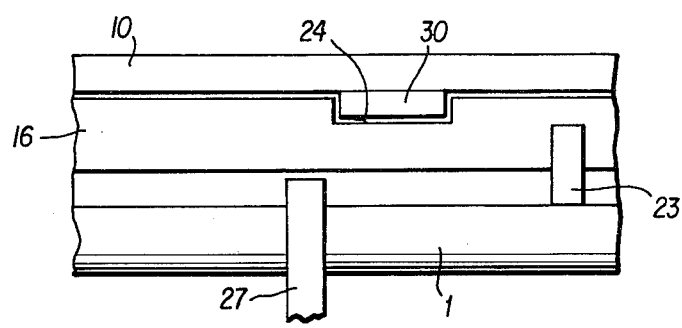
FIG. 3 is a detail of FIG. 2, showing a variant in which the flat and trap are aligned.

Axes 1, of which only several have been illustrated in FIG. 1, are deposited in large numbers inside a chute 2 limited by a forward wall 3 and side walls 4, also with lateral inserts 5 affixed to walls 4 via braces 6 in order to make it possible to adapt the device to various lenghts of axes 1 with a simple exchange of braces 6. Above the bottom 7 of the chute 2 there are two bottom tracks 8 that are adjustable, via a non-illustrated screw device, by sliding in their axial direction. Keys 9 are placed at the base of the forward wall 3 of the chute close to where the axes 1 lean, and furthermore, the bottom 7 of the chute, as well as the bottom tracks 8, stop at a distance from those keys 9 in order to form a wide bottom opening which is closed by the upper plate 10 of a drawer 11. The latter slides horizontally and perpendicular to the lengths of axes 1 via sliding guides 12 that slide on static sliding devices 13 which are attached to the table 14 of the device. This drawer 11 is attached to the extremity of the stem 15 of a jack 16 which makes it possible to move drawer 11 back and forth.

Inside the chute 2 and against the forward wall 3 two guides 17 are affixed. Each guide 17 includes a horizontal lower edge 18 located above the upper surface of the plate 10 at a distance that is sufficient to enable one row of axes 1 to reach the keys 9. Each guide also includes a vertical edge 19 which is extended by an inclined upper edge 20 in order to orient the axes 1 in the direction of the entrance to the lower horizontal passage. Furthermore, according to the invention, in order to avoid the possibility that the axes 1 can mutually block one another at the entrance of that passage with a "bridge" forming, one may adjust the axial position of the bottom tracks 8 in such a way that between the extremity 21 of each track 8 and the corresponding key 9, there is room to place only one entire set of axes, in addition to an overall slack of 2 to 3 mm. Hence, during each back and forth motion of the plate 10, the axes 1 are subjected to rotation motions upon themselves and a slight displacement laterally which prevents the forming of a bridge.

The end position of the for the drawer 11 that corresponds to the retraction (rightward) of the jack 16, and the size of the keys 9, are adjusted so that between the extremity 22 of the plate 10 and the keys 9 there remains an opening which suffices to allow the first axis which is in contact with the keys 9, to fall into it when the drawer 11 is retracted.

In order to ensure that the following axis situated inside the horizontal passage does not fall also, below the chute opening are two bearing blades 23 that are located laterally in such a way that each axis 1 is contacted on a cylindrical part spaced from the squeeze flat 24 of the drive dog clutch borne by the axis.

In the forward (leftward) motion of the carriage 11, the plate 10 closes the passage opening while pushing the axis with its extremity 22, as the axis rests on the bearing blades 23, thus forcing it to roll on those blades and to go down the descending ramps 25, which form an extension of those blades. Upon that descent, the axis then rests on two bearing-sliding blades 26 and 27 designed to produce the angular indexing of the axis. To this end, the drawer 11 includes two push plates 28 and 29 that are affixed below the drawer, and extend to a height corresponding to the height of the middle of the axis 1 when the latter rests on the blades 26 and 27. Furthermore, the two push plates 28 and 29 are positioned in such a way that the axis 1 is pushed while maintaining it perpendicular to the direction of movement when that axis is pushed by the two push plates 28 and 29.

The drawer 11 also includes a trap 30 formed of a part that ends more or less perpendicular to the extremity 22 of the table 10 but sticking out axially somewhat, by about one axis diameter above the frontal common extremity 31 of the push plates 28 and 29, the latter ending axially to the right of the trap 30.

Moreover, the lower surface of the trap 30, which is located on the same end of the axis as the flat 24, is always at a distance from the upper edge of the blade 27 which is less than the diameter of the axis 1 and equal to or slightly higher than the edge of the axis measured from the flat 24.

So, when the axis 1, resting on the bearing-sliding blades 26 and 27, has its flat 24 pointing in any direction other than the desired indexed direction, it rests on those two blades at cylindrical sections as shown in 1a on FIG. 1, which places it in a slanting posture in relation to the horizontal since its end corresponding to the flat 24 is higher than the other extremity. This is because the vertical upper level of the blade 27 normally adjusted in such a way that the axis is horizontal when it rests with the flat on blade 27. Because of this slant, the axis is pushed by the frontal extremity of the trap 30 at the end of the axis corresponding to that trap, and not by the extremity of the push plate 29 which cannot reach it. Therefore, the axis is sloped horizontally and not strictly perpendicular to the direction of movement.

The axis rolls in that posture on two blades 26 and 27 until its flat is rotated onto the upper edge of the blade 27. This triggers the horizontal placement of the axis, and hence its positioning to the position shown schematically as 1b on FIG. 1. In the course of the such motion, the axis 1 is therefore immobilized in rotation, since it is caught between the blade 27 and the lower surface of the trap 30, and, hence, it can no longer roll but simply slides on the two blades 26, 27 this time by being pushed by the two push plates 28 and 29 in a position which is perpendicular to the direction of motion.

Once the drawer 11 reaches the extremity of its movement that corresponds to the extension of the jack 16, which is the position shown in FIG. 1, the axis tilts and falls into two bezels 32 that maintain it in an accurate position with its flat 24 indexed by the extremity of the blade 27 which is connected to a horizontal edge with a profile that permits this tilting. In this position, it will be taken over by the welding machine designed to apply and solder the fork axis drive dog clutch on the flat 24 of the axis 1, or the flat that was used for indexing.

It is clear that each back and forth motion of the drawer by the jack produces also the separation, distribution, orientation and positioning in an accurate way of a new axis, regardless of the pace selected by the welding machine.

The drawer maneuver 11, because of the single jack 16, can be fairly quiet, and the chute 2 can also provide a significant store of axes without impeding the maneuver.

As a variation, it is possible to index the axes with their flats in an upper position by restricting the lateral width of the trap 30 in such a way that it remains inside the axial limits of the flat 24, and by positioning the second bearing-sliding blade 27 axially out of the flat. Furthermore, in that case, one eliminates the tilting at the end of the drawer movement. It is also possible, as another variation, to index the axes on a first flat, then to trigger a rocking motion with an upward or downward tilt of the bearing-sliding blades in order to be indexed on a second flat with a lateral movement of the support blades. All of those variations do not alter the principle of the indexation through the cooperation of the trap 30 and the push plates 28 and 29 with the bearing-sliding blades 26 and 27 in order to roll the axis to the desired direction, then blocking that rotation for subsequent sliding movement, all of this from a simple motiion of the drawer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for separating, orienting and positioning cylindrical axes, each of said axes having a flat on the cylindrical surface thereof, said apparatus comprising:

a fixed chute having front and side walls and having a bottom opening;

means for supplying a plurality of said axes to said chute such that said axes extend in a first direction parallel to said front wall and in a horizontal plane;

a drawer closing said bottom opening;

guide means inside said chute and fixed to said front wall, said guide means having a lower edge vertically spaced from said drawer by a first distance equal to at least one axis diameter and less than two axis diameters, whereby only one row of said axes may be positioned adjacent the bottom of said front wall;

means for moving said drawer in a second direction between a first and a second position, wherein said second direction is horizontal and transverse to said first direction, wherein in said first position a distal end of said drawer is positioned below said chute and horizontally spaced from said front wall by said first distance, and wherein said in second position said distal end of said drawer is on a side of said front wall opposite that of said first position, whereby only one of said axes is permitted to fall through said bottom opening only when said drawer is in said first position;

first support blades extending in said second direction from said first position towards said second position, said first support blades being located at a first location, not including the location of said flat, along said first direction, whereby an axis which has fallen through said bottom opening is supported for rolling movement on said first support blades as said drawer is moving towards said second position;

second support blades extending in said second direction from said first support blades towards said second position, one of said second support blades being located at a second location along said first direction;

push means fixed to said drawer for pushing said axis as said drawer is moving towards said second position; and trap means fixed to said distal end of said drawer, said trap means being horizontally spaced from said push means in said second direction by approximately one axis diameter, being spaced from said second support blades by a distance equal to said diameter of said axis minus the depth of said flat and being in a third location along said first direction, whereby rotation of said axis can be prevented by the cooperation of said flat and said trap means.

2. The apparatus of claim 1 wherein said chute includes bumpers on said front wall and means for adjusting the position of said means for supplying in said second direction.

3. The appartus of claim 1 wherein said second location is identical to said location of said flat along said first direction, whereby said rotation of said axis is prevented with said flat in contact with said one of said second support blades.

4. The apparatus of claim 1 wherein said third location is identical to said location of said flat along said first direction, whereby said rotation of said axis is prevented with said flat in contact with said trap means.

5. The apparatus of claims 3 or 4 wherein said one of said second support blades is vertically higher than the remainder of said second support blades.

6. The apparatus of claim 3 including a bezel for fixedly supporting said axis fixed to said second support blades at said second position and wherein said at least one of said second support blades includes a curved guide portion between said one of said second support blades and one of said bezels for tilting said axis.

* * * * *